United States Patent [19]

Allen

[11] Patent Number: 4,486,949

[45] Date of Patent: Dec. 11, 1984

[54] APPARATUS AND PROCESS FOR INSTALLING IDC CONNECTORS ONTO A RIBBON CABLE

[75] Inventor: William Allen, Stratford, Conn.

[73] Assignee: Burndy Corporation, Norwalk, Conn.

[21] Appl. No.: 431,917

[22] Filed: Sep. 30, 1982

[51] Int. Cl.$^{3}$ ........................ H01R 43/04; B23P 19/00

[52] U.S. Cl. .......................................... 29/861; 29/749

[58] Field of Search .............. 29/857, 749, 757, 33 M, 29/861

[56] References Cited

U.S. PATENT DOCUMENTS

| | | | |
|---|---|---|---|
| 4,281,442 | 8/1981 | Senior | 29/857 X |
| 4,332,083 | 6/1982 | Johnson et al. | 29/749 |
| 4,386,461 | 6/1983 | Plummer | 29/749 |
| 4,429,455 | 2/1984 | Roeker | 29/749 |

FOREIGN PATENT DOCUMENTS

| | | | |
|---|---|---|---|
| 4283 | 10/1979 | European Pat. Off. | 29/749 |

*Primary Examiner*—Howard N. Goldberg
*Assistant Examiner*—Carl J. Arbes
*Attorney, Agent, or Firm*—Howard S. Reiter

[57] ABSTRACT

An apparatus and process for assembling connectors to a flat or ribbon-type cable. The apparatus employs rams supporting respective cover members and connector bodies arranged at opposing sides of a cable. The rams are driven toward each other to assemble the connector body to the cover member with the cable sandwiched therebetween. An extraction member is utilized to support the assembled connector as the rams are withdrawn.

17 Claims, 7 Drawing Figures

PRIOR ART

APPARATUS AND PROCESS FOR INSTALLING IDC CONNECTORS ONTO A RIBBON CABLE

BACKGROUND OF THE INVENTION

This invention relates to an automatic apparatus and process for installing insulation displacement connectors, known as IDCs, onto ribbon or flat cable.

Ribbon-type cable utilizing IDC-type connectors has come into wide use in the electronics field, particularly in computer-type applications. The connectors are spaced along the cable so that in use they can interconnect electrical assemblies such as printed circuit boards. A need has existed for an automatic machine capable of assembling the connectors to the ribbon cable with increased speed. Previous attempts at such a machine had certain problems. They do not appear sufficiently flexible in that they are limited in application to connectors having specific members of pins, for example, 14 or 16 pin-type connectors. Also, their designs made it awkward for the operator to feed the ribbon cable into the work area and correctly align it thereby reducing production efficiency.

SUMMARY OF THE INVENTION

In accordance with the present invention, a semiautomatic assembly machine for assemblying IDC-type connectors or the like to a ribbon-type cable is provided which is more flexible than prior art approaches. It can be applied to a variety of IDC-type connectors, as desired, such as connectors having 24 pins. The connector body including the pin-type contacts and the cover member are fed from separate magazines thereby allowing easy movement and placement of the ribbon cable by the operator. The apparatus of the present invention further provides support for the connector body during the assembly process so that the pins won't be pushed out of the plastic body. Further, minor misalignment or bent pins are corrected during the assembly process.

The connectors, in accordanee with this invention, comprise a connector body including a plurality of contact pins and a cover member secured to the connector body. Upon assembly, the cable is sandwiched between the cover member and the connector body so that wires in the cable are electrically connected to desired ones of the pins. A guide is provided for supporting the cable in a desired orientation. A first assembly ram, including a recess for receiving and supporting the cover member, is arranged at one side of the guide. The first ram is supported for movement toward and away from the guide between a retracted position and an assembly position. A second assembly ram is provided with a plurality of holes arranged for receiving the pins of the connector body. It is arranged at an opposing side of the guide. The second ram is supported for movement toward and away from the guide between a retracted position and an assembly position.

An arrangement is provided for receiving and supporting the connector body with the pins oriented for insertion in the holes in the second ram. The drive system first moves the rams toward the guide and toward each other so that the second ram first engages the connector body and imbeds the pins in the respective holes in the ram. The rams then continue moving toward each other until reaching their respective assembly positions, whereat the cover member and the connector body engage each other and are secured together with the cable sandwiched therebetween. The drive system then moves the rams away from the guide and away from each other to their respective retracted positions. In order to disengage the rams from the assembled multi-pin connector, a device is provided for extracting the multi-pin connector from the second ram as the ram moves away from the guide toward its retracted position.

Preferably, a first pair of gates, pivotably supported and operatively associated with the recess in the first ram when in its retracted position, partially enclose the recess so that a cover member can be held therein. The gates are supported for movement away from the recess responsive to movement of the first ram toward the guide. The arrangement for receiving and supporting the connector body preferably comprises devices for receiving and supporting opposing sides of the connector body. Such devices are arranged to move in parallel with the second ram between respective retracted and assembly positions. A second pair of gates, operatively associated with the connector body side supports when in their retracted position, partially support a first face of the connector body. The second gates are arranged for movement away from the connector body side supports responsive to movement of the side supports towards the guide.

Preferably, the extraction device includes a portion for supporting at least a portion of an opposing second face of the connector body from which the contact pins protrude. Preferably, an arrangement is provided for delaying movement of the side supports, and the gates associated therewith, until the second ram has first seated itself against the connector body and imbedded the pins in the respective holes in the ram. Thereafter, the second ram moves with the side supports toward the guide and cable supported thereon. Simultaneously, the first ram moves toward the cable and guide.

The drives are, preferably, arranged in a first cycle to drive the rams to their assembly positions and in the second cycle to allow the rams to retract to their retracted positions.

Most preferably, a system is provided for automatically feeding in a sequential manner a cover member and a connector body from separate magazines to the respective recess and support arrangement. A control system coordinates the drive and the delivery of the connector components in a manner to provide for rapid and semi-automatic assembly.

It is an object of this invention to provide an improved apparatus and process for assembly IDC-type connectors to flat-type cable.

It is a further object of this invention to provide an apparatus and process as above wherein the assembly can be carried out semi-automatically with a high degree of productivity.

Further objects and advantages will become apparent from the following description and drawings.

DETAILED DESCRIPTION OF THE PREFERRED EMBODIMENTS

Figure 1:
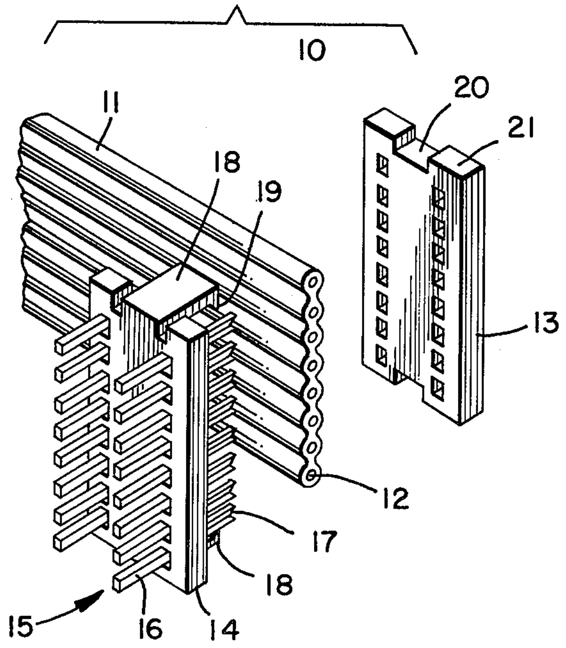
FIG. 1 is an exploded perspective view of an insulation displacement connector of the type for assembly in accordance with this invention.

Referring now to FIG. 1, an insulation displacement connector to ribbon-cable assembly 10 is shown in exploded fashion. The assembly 10 is comprised of a ribbon cable 11 including a plurality of wires 12 arranged in a row to form a flat cable. The cable 11 is sandwiched between a cover member 13 and a connector body 14. The connector body 14 includes a plurality of contact pins 15 imbedded therein. The portions 16 of the contact pins 15 facing away from the cable 11 are adapted for mating with a female connector socket (not shown). The portions 17 of the contact pins 15, facing the cable 11, are adapted to engage and make contact with respective wires 12 of the cable 11 when the connector 10 is assembled.

The connector body 14 includes extended portions 18 which serve to latch the connector body 14 to the cover member 13 with the cable 11 sandwiched therebetween. The extended portions 18 include a lip 19 which engages slot 20 of the cover member 13 during assembly to spread the extended portions 18 apart until the lip 19 can snap over the surface 20 of the cover member 13. As assembled, the cover member 13 is secured by the latching portions 18 onto the connector body 14 with the cable 11 sandwiched therebetween. If the assembly operation is carried out manually, it is difficult to properly align the components of the connector 10. Therefore, it is desired to provide an apparatus 22 which would enable the assembly of the IDC connector 10 to the ribbon or flat cable 11 in an efficient manner.

Figure 2:
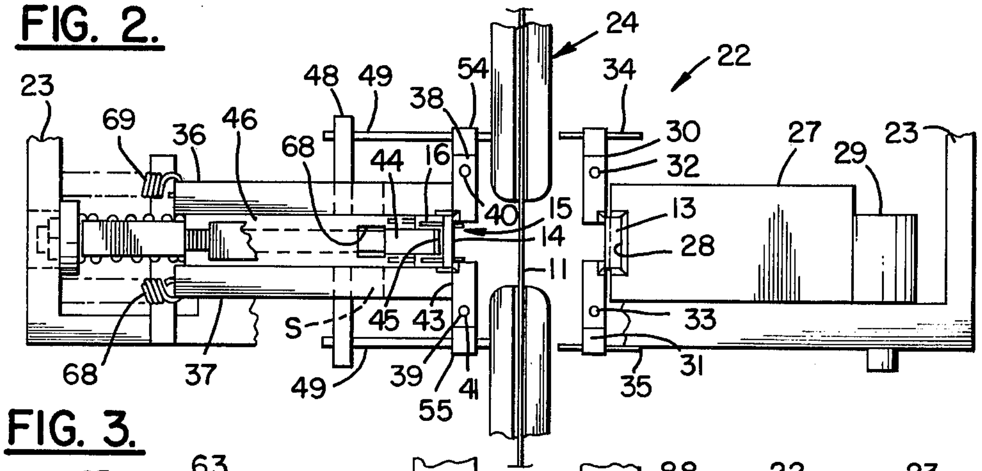
FIG. 2 is a partial top view of an assembly apparatus in accordance with this invention showing the rams in their retracted positions.
Figure 3:
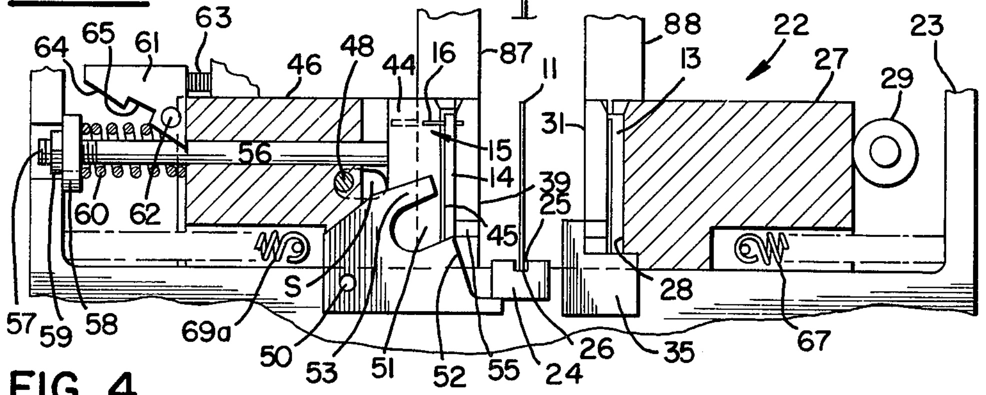
FIG. 3 is a side view in partial cross-section of the apparatus in FIG. 2.

Referring now to FIGS. 2–5, the assembly apparatus 22 is supported in a machine frame 23. A split guide system 24 is arranged to support the cable 11 on either side of the region to be engaged by the respective cover member 13 and connector body 14. The guide system 24 includes a slot 25 for supporting the lower cable edge 26 so that the cable 11 is properly aligned to appropriately connect the wires 12 (not shown) to the respective contact pins 15. A first assembly ram 27 includes a recess 28 for receiving and supporting the cover member 13. The surface of the machine frame 23, on which the ram 27 slides, supports the bottom end of the cover member 13. The ram 27 is arranged at one side of the guide system 24 and is supported in the machine frame 23 for movement toward and away from the guide system 24 between an assembly position wherein it engages the cover member 13 to the cable 11 and a retracted position as shown in FIGS. 2 and 3. The retracted position is delimited by means of a stop member 29.

Figure 4:
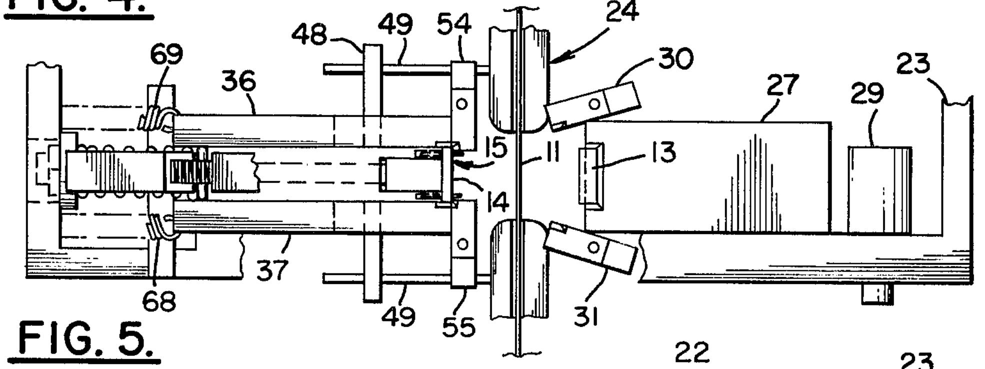
FIG. 4 is a top view of the apparatus of FIG. 2 with the rams moved partially towards one another.
Figure 5:
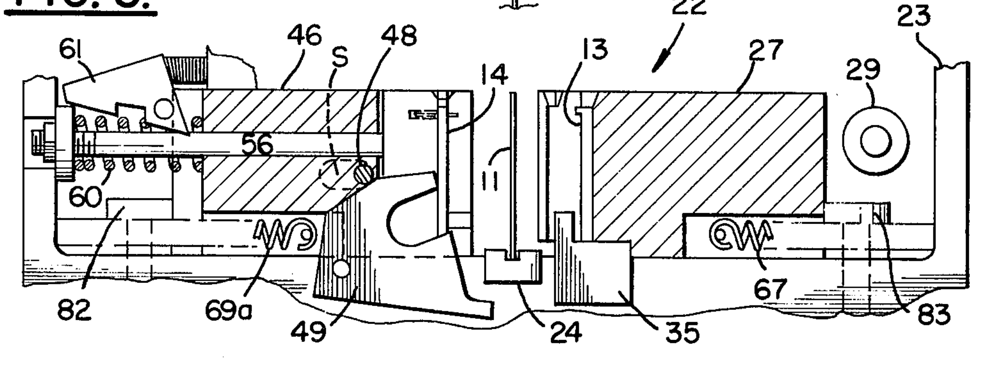
FIG. 5 is a side view in partial cross-section of the apparatus as in FIG. 4.

A first pair of gates 30 and 31 are arranged to cooperate with the ram 27 in its retracted position to at least partially enclose the recess 28 so that a cover member 13 is well supported prior to assembly. The gates 30 and 31 help to define a partially enclosed recess 28 into which the cover member 13 can be automatically fed. The gates 30 and 31 are pivotally supported in the machine frame 23 by means of pivot shafts 32 and 33. Stops 34 and 35 serve to delimit the position of the gates 30 and 31 when the ram 27 is in its retracted position. The gates 30 and 31 are biased to the position shown in FIG. 2 by means of springs (not shown) about shafts 32 and 33. The gates 30 and 31 responsively pivot away from the recess 28 as the ram 27 moves toward its assembly position as shown in FIGS. 4 and 5.

The connector body 14 is supported prior to assembly, as shown in FIG. 2 and 3, by side supporting members 36 and 37 arranged to receive and support opposing sides of the connector body 14. The surface of the machine frame 23 on which ram 46 slides supports the bottom end of the connector body 14. The side supporting members 36 and 37 are arranged for movement in the machine frame 23 between respective assembly and retracted positions. In their assembly positions, they serve to maintain the alignment of the connector body 14 as it is assembled to the cover member 13. In their retracted position, as shown in FIGS. 2 and 3, they serve to receive and support the connector body 14. A second pair of gates, 38 and 39, are arranged to cooperate with the side support members 36 and 37, when in their retracted position, for at least partially supporting a first face of the connector body 14. The second pair of gates, 38 and 39, are each pivotally supported in the machine frame 23 by means of pivot shafts, 40 and 41. The ends, 42 and 43, of the side support members 36 and 37 serve as stop surfaces to align the position of the gates 38 and 39 when the side support members are in their retracted position. The gates 38 and 39 are biased into engagement with the side support members 36 and 37 by means of springs (not shown).

An extraction member 44, which will be described in further detail hereafter, includes an end portion 45 for supporting at least a portion of an opposing second face of the connector body 14 from which the pin portions 16 protrude. In FIGS. 2 and 3, the extraction member 44 is shown in its retracted position. When the retraction member 44, side support members 36 and 37 and second gates 38 and 39 are in their respective retracted positions, they define a recess for receiving and supporting a connector body 14 in proper alignment for assembly to the cable 11. The connector bodies 14 can be fed to the recess defined by these members in an automated fashion, as will be described later.

A second assembly ram 46 is arranged between the side support members 36 and 37 for movement in the machine frame 23 between a retracted position, as in FIGS. 2 and 3, and an assembly position wherein it forces the connector body 14 into engagement with the cable 11 and the cover member 13 supported by the ram 27. The ram 46 includes a plurality of holes 47 for receiving the pin portions 16 of the connector body 14. The number of such holes 47 in the ram can be greater than the total number of pins in the connector body so that connector bodies 14, having various numbers of pins, can be assembled by the apparatus 22. For example, if the ram 46 included two rows of 12 holes, it would be possible for it to accept connector bodies 14 having 16, 20 or 24 pins as desired. The holes 44 are sized slightly larger than the pin portions 16 and can have a certain amount of tapered lead-in so that in the event they are slightly misaligned or slightly bent, they are properly aligned or straightened upon being imbedded in the holes 47 of the ram 46. The ram 46 includes a shaft 48 secured thereto which extends outwardly through slots 5 in the respective side support members 36 and 37. The shaft 48 serves to provide driving engagement between the ram 46 and the side support members 36 and 37.

When the side support members 36 and 37 and the ram 46 are in their retracted positions, locking members 49 serve to lock the gates 38 and 39 in the orientation shown in FIGS. 2 and 3. The locking members 49 are supported for pivotal movement by shaft 50 which is pivotally supported in the machine frame 23. The locking members 49 include a slot 51, a locking surface 52, and a cam surface 53. The gates 38 and 39 include respective locking tabs 54 and 55.

In operation and while the ram 46, etc., are in their retracted positions, the locking members 49 are arranged as shown in FIG. 2. In this orientation, the locking surface 52 engages the tab 54 or 55 of the gates 38 and 39 so as to prevent them from rotating about their shafts 40 or 41. When the ram 46 moves toward the cable 11, as in FIGS. 4 or 5, the shaft 48 engages the cam surface 53 of the locking members 49 to pivot the members downwardly to thereby release the gates 38 and 39 since the tabs 54 and 55 are free to move within slots 51 of the locking members 49.

The slots S in the side support members 36 and 37 serve to define a period of ram 46 travel before there is driving engagement between the ram 46 and the side support members 36 and 37. As the ram 46 moves in the direction of the cable 11, the pin portions 16 of the connector body 14 are first imbedded in the holes 47 before there is any movement of the side support members 36 and 37 as shown in FIGS. 4 and 5. During this time, the gates 38 and 39 are locked by the locking members 49 so that the connector body is effectively supported against movement as the ram 46 engages the pin portions 16. Thereafter, the gates are released by the locking members 49, pivoting downwardly. Simultaneously, the shaft 48 engages the forward surface of slots 5 to provide driving engagement so that the ram 46 and side support members 36 and 37 move in parallel toward the cable 11.

The extraction member 44 is mounted on a shaft 56 supported in the ram 46 for movement longitudinally in the ram 46. The shaft 56 extends well beyond the back end of the ram 46 and terminates in a threaded portion 57. When the ram is in its retracted position, as in FIG. 3, the threaded portion extends into a hole in the machine frame 23. A stop member 58 is supported about the shaft 56 and held in place by means of a nut 59. A spring 60 is arranged about shaft 56 between the stop member 58 and the back end of the ram 46 to bias the extraction member 44 toward its retracted position, as in FIGS. 2 and 3. In the retracted position, the stop member 58 engages the machine frame 23 to delimit the rearward movement, or retracted position of the extraction member 44, so that its surface 45 can serve as a receiving and support surface.

A second locking member 61 is arranged above the shaft 56 for pivotal movement about shaft 62, which is pivotally supported in the machine frame 23 (not shown). The second locking member 61 is biased to rotate in a counter-clockwise direction in FIG. 3 by means of a spring 63 supported in the machine frame 23. The purpose of the locking member 61 is to latch the extraction member 44 in its assembly position and to hold the extraction member in that position until the ram 46 is withdrawn sufficiently to disengage from the pin portions 16.

The latching of the member 61 occurs when it pivots in a counter-clockwise direction as the ram 46 moves toward its assembly position, as in FIGS. 4 and 5. The guide surface 64 of the locking member 61 engages the stop member 58 and rides thereon until the locking member falls into slot 65. At this time, the extraction member 44 is locked in its assembly position. The extraction member 44, which is supported on the shaft 56, is adapted to slide in a slot 66 extending inwardly from the assembly end of the ram 46. The closed end of the slot 66 acts to provide driving engagement to the extraction member 44 as the ram 46 moves toward its assembly position.

Referring now to FIGS. 2–6, the driving arrangement for the apparatus 22 of this invention will be described in greater detail. The first ram 27, which is arranged at one side of the guide 24, is retracted by means of springs 67 connected between the ram 27 and the frame 23. The second ram 46, arranged at an opposing side of the guide system 24, is retracted by means of springs 68 and 69 which are connected between the respective side support members 36 and 37 and the frame 23. Retracting spring **69*a* brings the ram 46 back to its retracted position. As the ram retracts, it permits side support members 36 and 37 to retract also due to the action of springs 68 and 69**.

Figure 6:
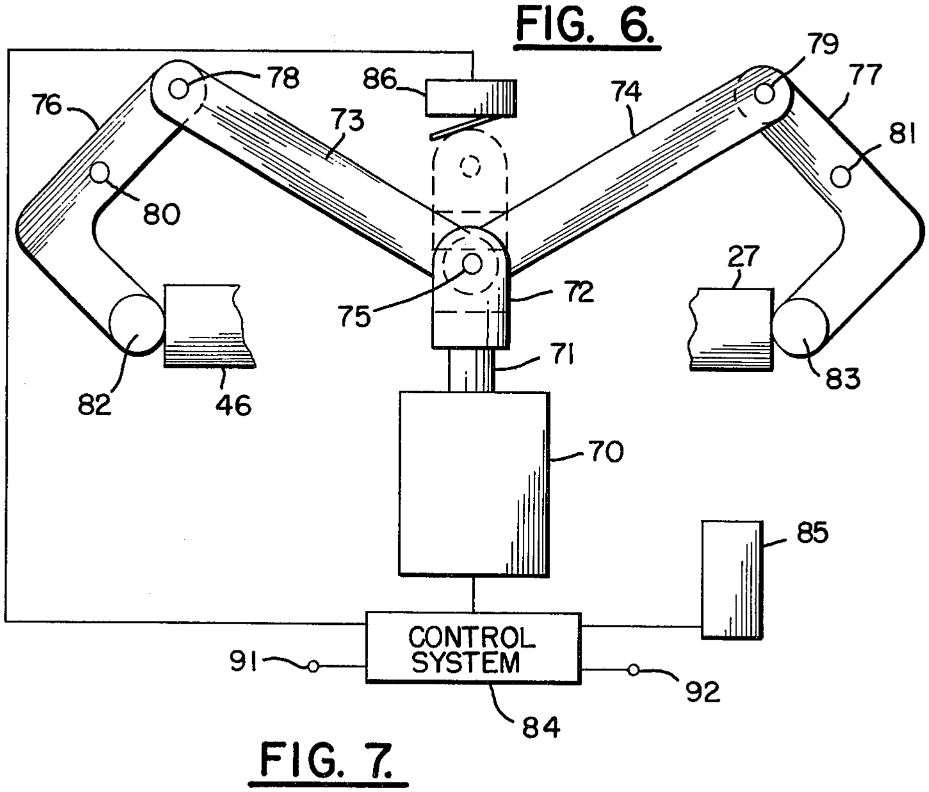
FIG. 6 is a top view of a drive system for moving the rams of the apparatus of FIG. 2.

In order to drive the rams 27 and 46 toward their respective assembly positions, any desired means, as are well known in the art, could be employed. Referring to FIG. 6, a preferred approach is shown comprising a pneumatic cylinder 70 having a piston arm 71 arranged for movement between the position shown in solid lines and that shown in phantom. The end of the piston arm 71 includes a fork-like member 72 to which connecting links 73 and 74 are pivotally connected via pin 75. The ends of the links 73 and 74 opposed to pin connection 75 are, in turn, pivotally connected to respective actuating members 76 and 77 via pins 78 and 79. The actuating members 76 and 77 are arranged to pivot about shafts 80 and 81, respectively.

The actuating members 76 and 77 have an L-type shape and are arranged in opposition as shown. The free ends of the actuating members 76 and 77 include upwardly extending projections, 82 and 83, which extend in a manner enabling them to contact rams 27 and 46. The projections 82 and 83 are adapted to pass through the frame 23 and engage the respective assembly rams 27 and 46 as shown. The drive system is controlled by means of a control system 84. The drive system is shown in FIG. 6 as it would be positioned when the rams 27 and 46 are in their retracted positions as in FIGS. 2 and 3.

The assembly cycle is initiated by means of a foot pedal-type switch 85 which signals the control system 84 to actuate the pneumatic cylinder 70 to move the fork member 72 to the position shown in phantom. This causes the actuating members 77 and 76 to pivot about shafts 80 and 81 to drive the rams toward each other. The assembly cycle ends when the fork-like member 72 engages sensing switch 86 which is connected to the control system 84 and stops further travel of the piston arms 71. The sensing switch 86 also initiates the control system 84 to begin the retraction cycle wherein the arm 71 and fork member 72 return to the position shown in solid lines and the rams 46 and 27 return to their retracted positions under the influence of springs 67 through 69. The drive system, as shown in FIG. 6, is arranged in the lower part of the machine frame 23 with the projections 82 and 83 extending up to engage the rams 27 and 46 through the frame, as shown in FIG. 5.

It is of course possible to utilize the apparatus 23 of this invention in a non-automatic manner by manually inserting the cover member 13 in the recess 28 and the connector body 14 in the recess defined by the side support members 36, 37, etc. However, the apparatus 22 is intended for semi-automatic operation wherein the respective assembly and retraction cycles are carried out rapidly to provide a high rate of productivity.

To accomplish automated delivery of a cover member 13 and a connector body 14 sequentially to the afore-noted recesses 28, etc., magazines 88 and 87, for providing a supply of cover members 13 and connector bodies 14, respectively, are supported by the machine frame (not shown) directly over the respective recesses 28 and that defined by the side supports 36 and 37, etc., as shown in FIG. 3. These magazines 87 and 88 may be of any conventional design, such as, for example, SLYD PAK type magazines, manufactured by Phielex Plastics Corporation 201 Eleventh Street, Piscataway, N.J.

Figure 7:
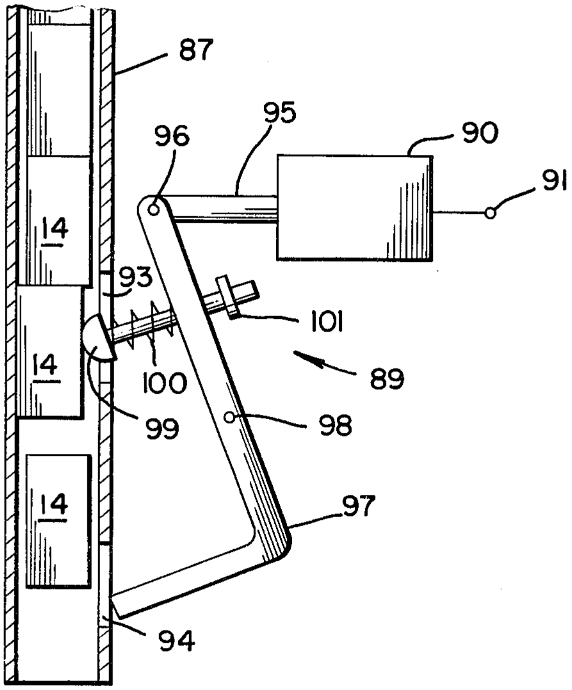
FIG. 7 is a side view in partial cross-section showing a loading mechanism and magazine for the cover members or connector bodies.

Automatic feeding of the cover members 13 or connector bodies 14 to the respective recesses can be achieved by means of a system, as shown in FIG. 7, or by any other conventional system as might be desired. In the system shown, an escapement mechanism 89 is provided for sequentially dropping individual cover members 13 or connector bodies 14 into the respective recesses. In a first embodiment, the escapement mechanism 89 can comprise a solenoid actuator 90 which is connected, via terminal 91, to the control system 84 for actuation. A similar escapement mechanism would be used for the other magazine 88, with its solenoid actuator 90 connected to the control system via terminal 92. The magazines 87 and 88 include two slots 93 and 94. The solenoid shaft 95 is arranged for movement between the extended position shown and a retracted position as shown in phantom. The shaft 95 is pivotally connected by pin 96 to an L-shaped member 97 pivoted about shaft 98. A sliding stop member 99 is slidably supported in the L-shaped stop member 97 and is biased by spring 100 to an extended position limited by stop 101.

In operation, the escapement mechanism 89 operates as follows. In the position shown, the connector body 14 has been released to fall into the recess defined by the side supporting members 36 and 37, etc. At the same time, the stop member 99 has engaged the next-in-line connector body 14 to prevent it from falling into the recess. The spring 100 provides for a biased engagement between the stop 99 and the next-in-line connector body 14. When the loose connector body is fed into the recess defined by the side support members 36, 37, etc., the solenoid 90 is actuated to withdraw the shaft 95 to the position shown in phantom whereby the L-shaped member 97 pivots under the remaining connector bodies 14 to stop their downward movement. At the same time, the stop 99 is moved out of engagement with the connector bodies 14. In this manner, by sequentially activating the solenoid 90, it is possible to selectively feed the connector bodies 14 or cover members 13 one-at-a-time into the desired recess. By tying control of the solenoid 90 to the control system 84, it is possible to coordinate the timing of the feeding of the respective cover member 13 and connector body 14 into the recesses to the cycling of the drive system.

In an alternative embodiment, the action of the piston arm 71 can be made to directly act on L-shaped member 97 to release one cover or body, as described above. The piston arm 71 of cylinder 70, as described above, has an assembly cycle and retraction cycle. An extra distance of travel of arm 71 can be built in, before the assembly cycle and after the retraction cycle, to directly operate the escapement mechanism. Upon fully retracting the rams 27 and 46 during the retraction cycle, the extra distance serves to move the L-shaped member 97 in the same motion described above to drop one cover or body. The return of the piston arm 71 over the extra distance then moves the L-shaped member 97 back to the position shown in FIG. 7. Any suitable linkage can be used to connect the piston arm 71 to L-shaped member 97 to provide movement of the latter only during the extra distance of travel of piston arm 71. In this embodiment, there is, of course, no need for the solenoid actuator 90, solenoid shaft 95 or terminal 91, shown in FIG. 7.

The apparatus 22 of this invention can then be operated as follows. The operator positions the cable 11 on the guide system 24 and then presses the foot pedal 85 to initiate the control system 84. A cover member 13 and connector body 14 are fed into the recesses by escapement 89 as described. The first cycle begins then with the drive system moving the rams 27 and 46 toward each other. The ram 46, during an initial stage of movement, imbeds the pin portion 16 in the respective holes 47, as in FIGS. 4 and 5. After this operation is completed, the shaft 48 engages the right-hand end of the slot unlocking gates 38 and 39, as in FIG. 5, to provide parallel movement of the side support members 36 and 37 and the ram 46. Slightly after this time, the extraction member 44 is engaged by the closed end of the slot 66 to provide parallel movement as well of the extraction member. The slight delay in timing is to assure that the extraction member 44 does not itself do any pushing. The side support members 36 and 37, the extraction member 44, and the ram 46 then move as an assembly carrying the connector body 14 toward the assembly position. As the rams 27 and 46 move toward their assembly positions, the gates 30, 31, 38, and 39 pivot away from the respective rams in the manner previously described. This is best illustrated in FIGS. 4 and 5. The rams 27 and 46 continue until they reach the assembly position at which the connector body 14 engages the cable 11 and the cover member 13 to provide the desired connector assembly 10.

At this time, the sensing switch 86 senses the end of the assembly cycle and initiates the retraction cycle. The locking member 61 has, at this point, engaged the stop member 58 so that as the ram 46 is retracted, the extraction member 44 remains in place until the ram strikes the locking member 61 raising it to release the extraction member, which, thereupon, returns to its retracted position, under the influence of spring 60. The extraction member firmly supports the connector body as the ram withdraws to assure that the pin portions 16 are disengaged from the ram 46 so that the rams 27 and 46 can return to their retracted positions without damaging the cable connector assembly 10. When the rams 37 and 46, and their associated elements, reach their retracted positions, the control system actuates the escapement mechanisms 89 to feed a new cover member 13 and connector body 14 into the apparatus. Thereafter, if the foot pedal 85 is depressed, the operational sequence is repeated.

Of course, the control system 84 would include an inhibit arrangement to prevent premature actuation of the drives before the cover member 13 and connector body 14 are fed to the respective recesses. Between each assembly cycle, the operator can advance the cable along the guide system 24 to the appropriate position for placing the next connector assembly 10 or insert a new cable 11. In this regard, an adjustable stop and cable guide and other suitable devices can be attached to the machine so that the operator can quickly locate the proper portion of the cable between the rams for efficient production.

It should be understood that the foregoing description is only illustrative of the invention. Various alternatives and modifications of the structural and functional features of the installation apparatus can be devised by those skilled in the art without departing from the invention. Accordingly, the present invention is intended to embrace all such alternatives, modifications and variances which fall within the spirit and scope of the appended claims.

What is claimed is:

1. A process for assembling a multi-pin connector to a ribbon-type cable, said connector comprising a connector body including a plurality of contact pins and a cover member secured to said connector body, said cable, as assembled, being sandwiched between said cover and said body so that wires in said cable are electrically connected to desired ones of said pins; said process comprising:

(a) providing a first assembly ram including a recess for receiving and supporting said cover member;

(b) providing a second assembly ram including a plurality of holes arranged for receiving said pins of said connector body;

(c) receiving and supporting said cover member in said recess;

(d) receiving and supporting said connector body with said pins oriented for insertion in said holes in said second ram;

(e) supporting said cable in a desired orientation between said ram;

(f) concurrently moving said rams toward said cable so that said second ram first engages said first connector body and imbeds said pins in said holes and continuing to move said rams until said cover member and said connector body engage each other and are secured together with said cable sandwiched therebetween;

(g) moving said rams away from each other and away from said cable to disengage said rams from said multi-pin connector; and (h) extracting said multi-pin connector from said second ram as said second ram moves away from said first ram.

2. A process as in claim 1 further including the steps of;

(a) providing a first gate means operatively associated with said recess in said first ram when said ram is in a retracted position for at least partially enclosing said recess; and (b) moving said first gate means away from said recess responsive to movement of said first ram toward said second ram.

3. A process as in claim 2 wherein said step of receiving and supporting said connector body comprises;

(a) providing means for receiving and supporting opposing sides of said connector body;

(b) moving said means for receiving and supporting said opposing sides of said connector body in parallel with said second ram between respective retracted and assembly positions;

(c) providing second gate means operatively associated with said connector body side support means when in its retracted position for at least partially supporting a first face of a connector body; and (d) moving said second gate means away from said connector body side support means responsive to movement of said side support means parallel with said second ram toward said first ram.

4. A process as in claim 3 further including the steps of; drivingly engaging said second ram to said connector body side supporting means after an initial period of movement of said second ram, so that said second ram, upon movement of said first ram, first engages said connector body during said initial period of movement to imbed said pins of said connector body and then moves conjointly with said connector body side support means toward said assembly position.

5. A process as in claim 4 further including the steps of;

providing a first locking means for locking said second gate means in a position wherein it is adapted to support said first face of said connector body; and automatically unlocking said first locking means following said initial period of movement of said second ram.

6. A process as in claim 5 wherein said step of extracting said multi-pin connector from said second ram comprises:

(a) providing a member supported by said second ram for movement in parallel therewith between a retracted position and an assembly position;

(b) biasing said member toward said retracted position;

(c) drivingly engaging said second ram to said extraction member after a period of movement of said second ram toward said first ram;

(d) locking said extracting member at said assembly position; and (e) automatically unlocking said member following a period of movement of said second ram toward its retracted position whereby upon unlocking said retraction member said member moves to its retracted position.

7. A process as in claim 6 wherein said step of moving said rams comprises in a first cycle moving said rams from their respective retracted positions to their respective assembly positions and in a second cycle, moving said rams from their respective assembly positions to their respective positions, and further comprises:

(a) initiating said first cycle;

(b) sensing movement of said rams to their respective assembly positions; and (c) responsive to said sensing step initiating said second cycle.

8. A process as in claim 7 further including the steps of sequentially supplying a cover member to said recess in said first ram prior to said first cycle; and sequentially supplying a connector body to said connector body receiving and support means prior to said first cycle.

9. An apparatus for assemblying a multi-pin connector to a ribbon-type cable, said connector comprising a connector body including a plurality of contact pins and a cover member secured to said connector body, said cable as assembled being sandwiched between said cover and said body so that wires in said cable are electrically connected to desired ones of said pins; said apparatus comprising:

(a) guide means for supporting said cable in a desired orientation;

(b) a first assembly ram including a recess for receiving and supporting said cover member, said first ram being arranged at one side of said guide means;

(c) means for supporting said first ram for movement toward and away from said guide means between a retracted position and an assembly position;

(d) a second assembly ram including a plurality of holes arranged for receiving said pins of said connector body, said second ram being arranged at an opposing side of said guide means;

(e) means for supporting said second ram for movement toward and away from said guide means between a retracted position and an assembly position;

(f) means for receiving and supporting said connector body with said pins oriented for insertion in said holes in said second ram;

(g) drive means for firstly and concurrently moving said rams towards said guide means and toward each other so that said second ram first engages said connector body and imbeds said pins in said holes and so that said rams continue moving toward each other until reaching their respective assembly positions whereat said cover member and said connector member engage each other and are secured together with said cable sandwiched therebetween and for secondly moving said rams away from said guide means and away from each other to their respective retracted positions to disengage said rams from assembled multi-pin connector; and (h) means for extracting said multi-pin connector from said second ram as said second ram moves away from said guide means toward a retracted position.

10. An apparatus as in claim 9 further including: first gate means operatively associated with said recess and said first ram when in its retracted position for at least partially enclosing said recess so that a cover member can be held therein; and means for supporting said first gate means for movement away from said recess responsive to movement of said first ram toward said guide means.

11. An apparatus as in claim 10 wherein said means for receiving and supporting said connector body comprises:

(a) means for receiving and supporting opposing sides of said connector body;

(b) means for supporting said connector body side supporting means for movement in parallel with said ram between respective retracted and assembly positions;

(c) second gate means operatively associated with said connector body side support means when in their retracted position for at least partially supporting a first face of said connector body; and (d) means for supporting said second gate means for movement away from said connector body side support means responsive to movement of said side support means toward said guide means.

12. An apparatus as in claim 11 wherein said extraction means includes a portion for supporting at least a portion of an opposing second face of said connector body from which said pins protrude.

13. An apparatus as in claim 12 further including: means for drivingly engaging said second ram to said connector body side supporting means after an initial period of movement of said second ram whereby said ram, upon movement towards said guide means, first engages said connector body during said initial period of movement and then moves conjointly with said connector body side support means toward said assembly position.

14. An apparatus as in claim 13, further including, first locking means for locking said second gate means in a position wherein it is adapted to support said first face of said connector body; and means for automatically unlocking said first locking means following said initial period of movement of said second ram.

15. An apparatus as in claim 14 wherein said extraction means comprises;

(a) a member supported by said second ram for movement in parallel therewith between a retracted position and an assembly position;

(b) means for biasing said member toward said retracted position;

(c) means for drivingly engaging said second ram to said extraction member after a period of movement of said second ram towards said guide means;

(d) second means for locking said extraction member at said assembly position; and (e) means for automatically unlocking said second locking means following a period of movement of said second ram toward its retracted position whereby, upon unlocking of said second locking means, said extraction member moves to its retracted position.

16. An apparatus as in claim 15 further including means for actuating said drive means; said actuating means including control means operative in a first cycle to actuate said drive means to move said rams from their respective retracted positions to their respective assembly positions and, in a second cycle, to move said rams from their respective assembly positions to their retracted positions, said control means including:

(a) means comprising a switch for initiating said first cycle; and (b) means for sensing movement of said rams to their respective assembly positions for initiating said second cycle.

17. An apparatus as in claim 16 further including:

(a) first means for sequentially supplying cover members to said recess in said first ram in its retracted position;

(b) second means for sequentially supplying connector bodies to said connector body receiving and support means; and wherein (c) said control means is adapted to actuate said first and second sequential supply means to supply a cover member and a connector body prior to initiation of said first cycle.

* * * * *